(12) United States Patent
Schuren et al.

(10) Patent No.: US 7,935,778 B2
(45) Date of Patent: May 3, 2011

(54) PHENOL RESIN, USE OF A PHENOL RESIN AS WELL AS MOULDED PRODUCT FORMED THEREFROM

(75) Inventors: Gerardus Wilhelmus Schuren, Heel (NL); Theodorus Vrijsen, Eksel (BE)

(73) Assignee: Trespa International B.V., Weert (NL)

( * ) Notice: Subject to any disclaimer, the term of this patent is extended or adjusted under 35 U.S.C. 154(b) by 1419 days.

(21) Appl. No.: 10/539,861

(22) PCT Filed: Jan. 15, 2004

(86) PCT No.: PCT/NL2004/000036
§ 371 (c)(1),
(2), (4) Date: Jun. 17, 2005

(87) PCT Pub. No.: WO2004/065445
PCT Pub. Date: Aug. 5, 2004

(65) Prior Publication Data
US 2006/0014007 A1    Jan. 19, 2006

(30) Foreign Application Priority Data
Jan. 17, 2003 (NL) ..................... 1022425

(51) Int. Cl.
*B29C 51/00* (2006.01)
*B32B 21/10* (2006.01)
*B32B 21/02* (2006.01)
*C08G 14/04* (2006.01)

(52) U.S. Cl. ..................... 528/129; 428/292.4; 264/134; 264/136; 264/320

(58) Field of Classification Search ........................ None
See application file for complete search history.

(56) References Cited

U.S. PATENT DOCUMENTS

| 4,116,921 A | * | 9/1978 | Olivo et al. ................... 524/594 |
| 4,337,334 A | | 6/1982 | Shimizu et al. ............... 528/137 |
| 4,403,066 A | * | 9/1983 | Brode et al. .................. 524/876 |
| 5,202,189 A | * | 4/1993 | Shea ............................ 428/436 |
| 5,202,403 A | * | 4/1993 | Doering ....................... 527/403 |
| 6,716,729 B2 | | 4/2004 | Arbuckle et al. ............. 438/531 |

FOREIGN PATENT DOCUMENTS

| JP | 06-049159 | 2/1994 |
| WO | WO 91/19749 | 12/1991 |
| WO | 01/46101 A1 | 6/2001 |

* cited by examiner

*Primary Examiner* — Edmund H. Lee
(74) *Attorney, Agent, or Firm* — Roberts & Roberts, LLP

(57) ABSTRACT

The present invention relates to a phenol resin obtained by reacting phenolic compounds with formaldehyde and/or formaldehyde-forming compounds. The present invention furthermore relates to the use of such a phenol resin, as well as to a molded product having a core of solid, inert parts impregnated with such a phenol resin.

20 Claims, No Drawings

PHENOL RESIN, USE OF A PHENOL RESIN AS WELL AS MOULDED PRODUCT FORMED THEREFROM

The present invention relates to a phenol resin obtained by reacting phenolic compounds with formaldehyde and/or formaldehyde-forming compounds. The present invention furthermore relates to the use of such a phenol resin, as well as to a moulded product having a core of solid, inert parts impregnated with such a phenol resin.

U.S. Pat. No. 4,116,921 relates to a resin to be used in the production of moulded products. According to said document, such resins are characterized by a relatively narrow molecular weight distribution and low molecular weight, wherein the polydispersity of such resins is low. The polydispersity ranges from about 1.5 to about 5, in particular from about 1.7 to about 3. Said document furthermore indicates that the duration of the reaction is determined by the desired polydispersity. Although said document comprises nine examples of exclusively bisphenol A-based resins, no further details are provided in said examples with regard to the polydispersity that is used.

International application WO 01/46101 relates to so-called stable bisphenol compositions, which are used in usual lamination processes; no special details are mentioned with regard to the polydispersity. Only the ratio between phenol and formaldehyde and the free phenol content are mentioned as important parameters.

U.S. Pat. No. 4,337,334 relates to the preparation of a phenol resin, wherein the phenol component comprises the group of high molecular weight phenolic compounds, which latter compounds are obtained as by-products in the preparation of bisphenol A. Specific details with regard to the phenol resin are not known therefrom.

The phenol resin that is mentioned in the introduction is known per se from International application WO 91/19749, which has the same inventor as the present application. According to said International application, the molecular structure of the phenol resin obtained as a result of the reaction must meet a number of requirements, using a special ratio of the total number of reactive sites (A) in the phenol resin to the total number of sites (B) in the phenol resin to which formaldehyde is added, to the total number of sites (C) in the phenol resin in which two molecules of the phenolic compounds are condensed with each other through a methylene group, which ratio is as follows: (A):(B):(C)=1:(0.85 to 1.0):(less than or equal to 0.05, in particular less than or equal to 0.02).

From International application WO 01/74750 there is furthermore known a mixture which is used in the preparation of phenol resins, epoxide resins or formaldehyde resins, which starting mixture contains 35 to 75 wt. % of p,p-bisphenol A, 5 to 25 wt. % of o,p-bisphenol A and 20 to 50 wt. % of secondary products which are produced during the preparation of bisphenol A, wherein the sum of the proportions by weight of p,p-bisphenol A and o,p-bisphenol A is 50 to 80 wt. % and wherein the sum of the proportions by weight of p,p-bisphenol A and o,p-bisphenol A and the secondary products is 100 wt. %. In particular, the mixture additionally contains 0 to 90 wt. % of phenol, with respect to the total weight of the mixture then produced. Further details with regard to the phenol resin prepared with said starting material are not provided in said document, not to mention the specific requirements that are made of a phenol resin used in the production of rigid moulded products.

The object of the present invention is to provide a phenol resin having a chemical-physical composition such that it is possible to use heavier impregnation papers than in the prior art for forming moulded products obtained by impregnating solid inert parts, in particular impregnation paper, with phenol resin, within which impregnation papers the phenol resin distributes itself evenly.

Another object of the present invention is to provide a phenol resin having a chemical-physical composition such that it is possible to obtain moulded products which have a higher mechanical strength than the moulded products that are known from the prior art.

Yet another object of the present invention is to provide a phenol resin having a chemical-physical composition such that it is possible to obtain moulded products having a lower water absorption than the moulded products that are known from the prior art.

Yet another object of the present invention is to provide a phenol resin having a chemical-physical composition such that it is possible to form moulded products in which blistering will occur less easily than in prior art moulded products when such products are used in extreme conditions, viz. a higher relative humidity and high temperatures.

According to the present invention, the phenol resin as referred to in the introduction is characterized in that the phenol resin has a polydispersity of maximally 1.85, especially preferably maximally 1.7, and a weight average molecular weight ($M_w$) of maximally 600, in particular maximally 520.

Using such a phenol resin, it is possible to achieve one or more of the aforesaid objects. The term "polydispersity" as used in the present description is a dimensionless parameter, which is known to those skilled in the art and which is defined as the quotient of the average molecular weight, $M_w$, and the molecular mass that comprises the largest number of molecules, $M_n$, viz. $M_w/M_n$. The ratio $M_w/M_n$ can be considered to be the width of the molecular weight distribution obtained through a GPC method. If a phenol resin having a polydispersity outside the aforesaid range is used, an unsatisfactory impregnation behaviour will be observed, in particular in the case of heavier papers, which has an adverse effect, e.g. on the distribution of the resin in a moulded product formed of impregnation paper, and which is thus disadvantageous with regard to the mechanical properties and the hygric values thereof.

In a special embodiment, it is especially preferable to use a weight percentage of phenol in the phenolic compounds of maximally 95%, in particular 25-75%. If a weight percentage of phenol of more than 95% is used, the moulded product obtained by means of such a phenol resin will exhibit shortcomings as regards its characteristics. The phenolic compounds that are mentioned in the present invention mainly include bisphenols an polyphenols, in particular low-molecular novolacs or bisphenols and polyphenols as obtained in the preparation of p,p-bisphenol A, for example high-molecular condensates, o,p-bisphenol A, o,o-bisphenol A, chromanes, indanes, trisphenols, ispropenylphenols and the like, as well as the mixtures thereof.

The chemical reactions that occur in the preparation of the present phenol resin can in fact be considered to comprise three subreactions:
1) activation
2) addition reaction, and
3) condensation reaction.

The conversion value for the addition reaction generally ranges between 50 and 100%, preferably it is >90%. The conversion value of the condensation reaction generally ranges between 0 and 50%, preferably between 15 and 25%. If a phenol resin that meets one or more of the aforesaid requirements is to be prepared, the conversion of volatile resin forming components, such as formaldehyde and phenol, is preferably at least 75%, more preferably at least 90%.

When specific characteristics of a moulded product to be formed are required, the phenol resin may furthermore comprise one or more components selected from the group consisting of fire retardants, plasticisers, fillers, colorants and binders, such as aminoplasts and the like. Such components are used in quantities that are known to those skilled in the art.

The present invention furthermore relates to the use of the above-described phenol resin for forming moulded products obtained by impregnating solid inert parts, in particular impregnation paper, with the phenol resin and subsequently subjecting the obtained assembly to a pressing operation so as to form moulded products, using an elevated temperature and an elevated pressure.

Using the present phenol resin, an impregnation paper having a weight of at least 160 g/m², in particular at least 215 g/m², may be used as the inert part. It is generally known that the commercially available impregnation papers have an average moisture percentage of 2.5-5%, wherein the paper weights used in the present description relate to such commercially available impregnation paper, which still contains a small amount of moisture.

In a special embodiment, an impregnation paper having a weight ranging from 250 to 400 g/m² may be used as the inert part, which weight exhibits a satisfactory impregnation behaviour of the phenol resin prepared in accordance with the present invention.

In a specific embodiment, it is desirable to provide at least one surface of the assembly with a decorative layer prior to or after the pressing operation.

In a specific embodiment a stationary press is used for pressing the impregnation paper impregnated with the present phenol resin into moulded products. On the other hand, it is also possible to use a continuous press for such an operation.

The moulded product obtained by using the present phenol resin preferably has a thickness varying from 0.2 to 50 50 mm, in particular from 0.5 to 20 mm.

The present invention further relates to the use of the present all the product both indoors and outdoors, wherein said outdoor use in particular relates to the cladding or facade of buildings. Said indoor use in particular relates to the use of furniture, worktops and table tops, storage compartments such as lockers in swimming pools and the like.

In order to provide a better understanding of the invention, the present invention will now be explained by means of a number of examples, in which connection it should be noted, however, that the present invention is by no means limited to such special examples. The impregnation quality ratings used in the tables below are based on a scale of 1-5, in which 1 means unacceptable, 2 means passable, 3 means mediocre, 4 means good and 5 means excellent.

COMPARATIVE EXAMPLE 1

A phenol resin was prepared by reacting pure phenol with formaldehyde, wherein phenol resins having different polydispersity values were obtained by varying the reaction times, in particular by adding varying amounts of catalyst. The phenol resins thus obtained were subsequently used for forming moulded products, with various impregnation papers having different paper weights being used. The obtained results are shown in Table 1. The reduction of the polydispersity has an advantageous influence on the impregnation quality, to be true, but the obtained results were still unsatisfactory for the heavier types of papers.

TABLE 1

| Type of resin | Cat. mol. % | Poly- dispersity | $M_W$ | Sum of volatile resin forming components % | Impregnation quality rating Paper weight g/m² | | | |
|---|---|---|---|---|---|---|---|---|
| | | | | | 300 | 254 | 215 | 160 |
| Phenol | 1 | 2.26 | 589 | 15.1 | 1 | 1 | 1 | 3 |
| | 2 | 2.15 | 513 | 10.6 | 1 | 1 | 2 | 3 |
| | 3 | 2.03 | 474 | 7.4 | 1 | 1 | 3 | 4 |
| | 4 | 1.96 | 468 | 6.0 | 1 | 2 | 3 | 4 |
| | 5 | 1.91 | 471 | 5.3 | 1 | 2 | 3 | 4 |
| | 7 | 1.92 | 477 | 5.5 | 1 | 2 | 3 | 4 |

EXAMPLE 1

The operations as described above in Comparative Example 1 were repeated, except that a 50:50 wt. % mixture of bisphenol A and phenol was used as the starting material for preparing phenol resin. The obtained results are shown in Table 2.

TABLE 2

| Type of resin | Cat. mol. % | Poly- dispersity | $M_W$ | Sum of volatile resin forming components % | Impregnation quality rating Paper weight g/m² | | | |
|---|---|---|---|---|---|---|---|---|
| | | | | | 300 | 254 | 215 | 160 |
| Bisphenol A/phenol 50/50% | 1 | 2.01 | 603 | 11.8 | 1 | 3 | 3 | 3 |
| | 2 | 1.79 | 481 | 8.1 | 3 | 4 | 4 | 4 |
| | 3 | 1.68 | 458 | 6.0 | 4 | 4 | 5 | 5 |
| | 4 | 1.62 | 441 | 5.2 | 4 | 5 | 5 | 5 |
| | 5 | 1.6 | 424 | 4.1 | 4 | 4 | 5 | 5 |
| | 7 | 1.67 | 438 | 4.3 | 4 | 4 | 5 | 5 |

EXAMPLE 2

The operations as described above in Comparative Example 1 were repeated, except that a 30:70 wt. % mixture of low polymeric phenols, such as bisphenols and trisphenols, by-products obtained in the preparation of p,p-bisphenol A, on the one hand and phenol on the other hand was used as the starting material for the preparation of phenol resin. The obtained results are shown in Table 3.

TABLE 3

| Type of resin | Cat. mol. % | Poly-dispersity | $M_W$ | Sum of volatile resin forming components % | Impregnation quality rating Paper weight g/m² | | | |
|---|---|---|---|---|---|---|---|---|
| | | | | | 300 | 254 | 215 | 160 |
| Low polymeric phenols/ phenol 30/70% | 1 | 2.07 | 623 | 12.8 | 1 | 2 | 3 | 3 |
| | 2 | 1.77 | 503 | 9.8 | 2 | 2 | 4 | 4 |
| | 3 | 1.72 | 475 | 7.4 | 4 | 4 | 4 | 5 |
| | 4 | 1.67 | 475 | 6.2 | 4 | 5 | 5 | 5 |
| | 5 | 1.68 | 472 | 5.2 | 4 | 4 | 5 | 5 |
| | 7 | 1.74 | 487 | 4.8 | 4 | 4 | 4 | 4 |

EXAMPLE 3

The operations as described in Comparative Example 1 were repeated, except that a 60:40 wt. % mixture of low polymeric phenols, such as bisphenols and trisphenols, by-products obtained in the preparation of p,p-bisphenol A, on the one hand and phenol on the other hand was used as the starting material. The obtained results are shown in Table 4.

TABLE 4

| Type of resin | Cat. mol. % | Poly-dispersiteit | $M_W$ | Sum of volatile resin forming components % | Impregnation quality rating Paper weight g/m² | | | |
|---|---|---|---|---|---|---|---|---|
| | | | | | 300 | 254 | 215 | 160 |
| Low polymeric phenols/ phenol 60/40% | 1 | 1.83 | 536 | 9.8 | 2 | 2 | 3 | 4 |
| | 2 | 1.66 | 442 | 7.1 | 4 | 4 | 5 | 5 |
| | 3 | 1.55 | 412 | 5.2 | 5 | 5 | 5 | 5 |
| | 4 | 1.55 | 422 | 3.8 | 5 | 5 | 5 | 5 |
| | 5 | 1.58 | 428 | 3.2 | 4 | 5 | 5 | 5 |
| | 7 | 1.65 | 432 | 3.3 | 4 | 4 | 4 | 5 |

EXAMPLE 4

The operations as described in Comparative Example 1 were repeated, except that a 90:10 wt. % mixture of low polymeric phenols, such as bisphenols and trisphenols, by-products obtained in the preparation of p,p-bisphenol A, on the one hand and phenol on the other hand was used as the starting material. The obtained results are shown in Table 5.

TABLE 5

| Type of resin | Cat. mol. % | Poly-dispersity | $M_W$ | Sum of volatile resin forming components % | Impregnation quality rating Paper weight g/m² | | | |
|---|---|---|---|---|---|---|---|---|
| | | | | | 300 | 254 | 215 | 160 |
| Low polymeric phenols/ phenol 90/10% | 1 | 1.86 | 556 | 6.9 | 2 | 3 | 3 | 3 |
| | 2 | 1.62 | 486 | 3.2 | 4 | 4 | 4 | 5 |
| | 3 | 1.54 | 439 | 2.1 | 4 | 4 | 5 | 5 |
| | 4 | 1.55 | 434 | 1.8 | 5 | 5 | 5 | 5 |
| | 5 | 1.58 | 442 | 2 | 4 | 4 | 5 | 5 |
| | 7 | 1.68 | 454 | 2.1 | 4 | 4 | 4 | 5 |

EXAMPLE 5

The operations as described in Comparative Example 1 were repeated, except that a 80:20 wt. % mixture of polyphenols (higher-polymeric phenols) and phenol was used as the starting material. The obtained results are shown in Table 6.

TABLE 6

| Type resin | Cat. mol. % | Poly-dispersity | $M_W$ | Sum of volatile resin forming components | Impregnation quality rating Paper weight (g/m²) | | | |
|---|---|---|---|---|---|---|---|---|
| | | | | | 300 | 254 | 215 | 160 |
| Polyphenol/phenol 80/20 | 2 | 2.01 | 685 | 3.9 | 1 | 1 | 1 | 1 |
| | 3 | 1.94 | 591 | 3.0 | 1 | 1 | 2 | 2 |
| | 4 | 1.81 | 612 | 2.7 | 1 | 1 | 2 | 2 |
| | 5 | 1.83 | 580 | 2.6 | 2 | 2 | 3 | 4 |

TABLE 7

| Impregnation quality rating | Resin distribution of the paper | Mechanical strengths | Hygric values (swelling) | Blistering |
|---|---|---|---|---|
| 1 | − | − | − | − |
| 2 | − | 0 | − | − |
| 3 | 0 | 0 | 0 | 0 |
| 4 | + | 0 | + | + |
| 5 | + | + | + | + |

− means poorer than average
0 means average
+ means above average

The impregnation quality rating that is included in Tables 1-6 is based on a scale of 1-5, in which 1 means unacceptable, 2 means passable, 3 means mediocre, 4 means good and 5 means excellent. In Table 7 these ratings 1-5 for the impregnation quality are related to the resin distribution, the mechanical properties, the hygric values and the tendency to form blisters. Furthermore it should be noted that the aforesaid phenol resins were all prepared under reflux conditions at a temperature of less than 105° C., wherein, after condensation, the viscosity of the resins thus prepared was set at a value of 200 cP with the addition of a solvent. The average molecular weight $M_w$ and the molecular mass comprising the largest number of molecules, $M_n$, were determined by means of gel permeation chromatography. The polydispersity listed in Tables 1-6 is $M_w/M_n$. The impregnation quality listed in tables 1-6 was assessed by subjecting the resin-impregnated impregnation papers to a pressing operation in a standard pressing cycle, after which a so-called bevel was milled off the plate thus obtained, and the homogeneity of the milled surface was assessed.

From the aforesaid Tables 1-6 it follows that the use of a paper weight of e.g. 300 g/m² for a resin obtained from pure phenol (see Comparative Example 1) having a polydispersity ranging from 1.91 to 2.26 leads to an unacceptable impregnation quality, in spite of the fact that the weight average molecular weight is less than 600. On the other hand, if a 50:50 wt. % mixture of bisphenol A and phenol is used as the starting material for preparing phenol resin (see Example 1), a good impregnation quality is obtained at a polydispersity of 1.68 and an $M_w$ of less than 500, using a paper weight of 300 g/m². According to Example 2, a good impregnation quality is obtained for a paper weight of 300 g/m² if a polydispersity value of 1.72 is used, using a 30:70 wt. % mixture of low-polymeric phenols and phenol as the starting material. From Table 4 it follows that the further reduction to 40% of the weight percentage of phenol in the starting material mixture having a composition of low-polymeric phenols and phenol leads to a lower polydispersity value, wherein a polydispersity of 1.55 and an $M_w$ of less than 450 leads to an excellent impregnation quality for a paper weight varying from 160 to 300 g/m². When the amount of phenol in a starting material consisting of a 90:10 wt. % mixture of low-polymeric phenols and phenol is reduced even further (see Example 4), it appears that a polydispersity value of 1.86 leads to a mediocre impregnation quality for a paper weight of 254 g/m² and a passable impregnation quality for a paper weight of 215 g/m². Table 6 clearly shows that a polydispersity lower than 1.85 in combination with an $M_w$ higher than 600 leads to an unsatisfactory result.

From the aforesaid experimental results it follows that a polydispersity of maximally 1.85 and a weight average molecular weight of maximally 600 makes it possible to form heavier impregnation papers into a desired moulded product whilst maintaining a good resin distribution, whereas in the case of pure phenol resins a satisfactory impregnation behaviour is only obtained with low-value paper weights. A moulded product having a good impregnation quality has significantly better characteristics than a poorly impregnated moulded product, in particular a higher mechanical strength, a lower water absorption and a decreased tendency to form blisters, when such a product is used under severe conditions, in particular a relative humidity of 100% and high temperatures.

The invention claimed is:

1. A phenol resin consisting essentially of a reaction product obtained by a process consisting essentially of reacting phenolic compounds with formaldehyde and/or formaldehyde-forming compounds, wherein the phenol resin has a polydispersity of maximally 1.85 and a weight average molecular weight ($M_w$) of maximally 600.

2. The phenol resin according to claim 1, wherein said phenol resin has a polydispersity of maximally 1.7.

3. The phenol resin according to claim 1, wherein said weight average molecular weight ($M_w$) is maximally 422.

4. The phenol resin according to claim 1, wherein the weight percentage of phenol in the phenolic compounds is maximally 95%.

5. The phenol resin according to claim 1, wherein the weight percentage of phenol in the phenolic compounds ranges between 25 and 75%.

6. The phenol resin according to claim 1, wherein the phenolic compounds comprise bisphenols and polyphenols.

7. The phenol resin according to claim 1, wherein said phenolic compounds comprise low-molecular novolacs.

8. The phenol resin according to claim 6, wherein said bisphenols comprise p,p-bisphenol A.

9. The phenol resin according to claim 1, wherein the conversion of phenolic compounds, formaldehyde and/or formaldehyde-forming compounds is at least 75%.

10. The phenol resin according to claim 1, wherein the conversion of phenolic compounds, formaldehyde and/or formaldehyde-forming compounds is at least 90%.

11. The phenol resin according to claim 1, wherein the phenol resin furthermore comprises one or more components selected from the group consisting of fire retardants, plasticisers, fillers, colorants and binders.

12. A method for forming moulded products by impregnating solid inert parts with a phenol resin to form an assembly, and subsequently subjecting the obtained assembly to a pressing operation at an elevated temperature and an elevated pressure so as to form moulded products, which phenol resin consists essentially of a reaction product obtained by a process consisting essentially of reacting phenolic compounds with formaldehyde and/or formaldehyde-forming compounds, wherein the phenol resin has a polydispersity of maximally 1.85 and a weight average molecular weight ($M_w$) of maximally 600.

13. The method according to claim 12, comprising an impregnation paper having a weight of at least 160 g/m² as the solid inert part.

14. The method according to claim 12 comprising an impregnation paper having a weight ranging between 250 and 400 g/m² as the inert part.

15. The method according to claim 12, wherein at least one surface of the assembly is provided with a decorative layer prior to or after said pressing operation.

16. The method according to claim 12, wherein a stationary press is used for pressing the moulded products in the pressing operation.

17. The method according to claim 12, wherein a continuous press is used for pressing the moulded products in the pressing operation.

18. A moulded product having a core of solid inert parts impregnated with a phenol resin, which phenol resin consists essentially of a reaction product obtained by a process consisting essentially of reacting phenolic compounds with formaldehyde and/or formaldehyde-forming compounds, wherein the phenol resin has a polydispersity of maximally 1.85 and a weight average molecular weight ($M_w$) of maximally 600.

19. The moulded product according to claim 18, wherein the thickness of the moulded product ranges between 0.2 and 50 mm.

20. The moulded product according to claim 18, wherein the thickness of the moulded product ranges between 0.5 and 20 mm.

* * * * *